US008934395B2

(12) United States Patent
Gorokhov et al.

(10) Patent No.: US 8,934,395 B2
(45) Date of Patent: Jan. 13, 2015

(54) METHOD AND APPARATUS FOR UPLINK NETWORK MIMO IN A WIRELESS COMMUNICATION SYSTEM

(75) Inventors: Alexei Y. Gorokhov, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 540 days.

(21) Appl. No.: 12/578,056

(22) Filed: Oct. 13, 2009

(65) Prior Publication Data

US 2010/0103834 A1 Apr. 29, 2010

Related U.S. Application Data

(60) Provisional application No. 61/108,294, filed on Oct. 24, 2008.

(51) Int. Cl.
*H04J 1/10* (2006.01)
*H04L 5/00* (2006.01)
*H04L 1/00* (2006.01)
*H04L 1/18* (2006.01)

(52) U.S. Cl.
CPC .............. *H04L 5/006* (2013.01); *H04L 5/0035* (2013.01); *H04L 1/0002* (2013.01); *H04L 5/0023* (2013.01); *H04L 5/0091* (2013.01); *H04L 5/0073* (2013.01); *H04L 1/1887* (2013.01); *H04L 1/0026* (2013.01); *H04L 1/0025* (2013.01); *H04L 2001/0097* (2013.01)
USPC .......................................... 370/315; 370/329

(58) Field of Classification Search
USPC ......... 370/252, 315, 328, 329, 332, 338, 341; 455/450–452.2
See application file for complete search history.

(56) References Cited

U.S. PATENT DOCUMENTS 7,564,814 B2 7/2009 Abraham et al.
2005/0063389 A1* 3/2005 Elliott et al. ............... 370/395.4
(Continued)

FOREIGN PATENT DOCUMENTS

CN 1981472 A 6/2007
CN 101282204 A 10/2008
(Continued)

OTHER PUBLICATIONS

International Search Report and Written Opinion—PCT/US2009/061850—ISA/EPO—Jun. 4, 2010.
(Continued)

*Primary Examiner* — Kan Yuen
(74) *Attorney, Agent, or Firm* — Dalei Dong

(57) ABSTRACT

Systems and methodologies are described herein that facilitate generation and processing of control signaling to support uplink network multiple-in-multiple-out (N-MIMO) communication in a wireless communication system. As described herein, respective network nodes associated with an uplink N-MIMO framework can generate channel state information (CSI) corresponding to an uplink channel from a designated network user to the respective nodes. Generated CSI can subsequently be communicated to an uplink anchor node for the network user in order to facilitate rate assignment, scheduling, and/or other operations with respect to the network user. As described herein, CSI generated and reported by respective cells can include channel profiles, carrier/interference profiles, estimated supported uplink rates, or the like. As additionally described herein, supplemental information such as observed interference levels, demodulation indicators, or the like can be communicated to an anchor node and utilized in rate assignment and/or scheduling.

25 Claims, 13 Drawing Sheets

(56) References Cited

U.S. PATENT DOCUMENTS

| | | | |
|---|---|---|---|
| 2005/0111429 A1 | 5/2005 | Kim et al. | |
| 2007/0002766 A1* | 1/2007 | Park et al. | 370/254 |
| 2008/0062920 A1* | 3/2008 | Pi et al. | 370/329 |
| 2008/0108369 A1* | 5/2008 | Visotsky et al. | 455/455 |
| 2008/0165720 A1* | 7/2008 | Hu et al. | 370/315 |
| 2008/0227461 A1 | 9/2008 | Dayal et al. | |
| 2009/0141676 A1* | 6/2009 | Maheshwari et al. | 370/329 |
| 2009/0268657 A1* | 10/2009 | Alexiou et al. | 370/315 |
| 2010/0054170 A1* | 3/2010 | Zhu et al. | 370/315 |
| 2010/0284362 A1* | 11/2010 | Tajima et al. | 370/329 |

FOREIGN PATENT DOCUMENTS

| | | |
|---|---|---|
| JP | 2005502218 A | 1/2005 |
| WO | WO0249305 A2 | 6/2002 |
| WO | WO2006088400 A1 | 8/2006 |
| WO | WO2008061045 | 5/2008 |
| WO | WO2008115110 A1 | 9/2008 |

OTHER PUBLICATIONS

Alcatel Shanghai Bell, "Multi-cel MIMO with distributed inter-cell interference suppression for LTE-A uplink", 3GPP TSG RAN WG1 #53, R1-082499, Jun. 30, 2008.

Ericsson: "LTE-Advanced—Coordinated Multipoint transmission/reception," 3GPP Draft TSG-RAN WG1 #53bis, R1-082469; Warsaw, Poland, XP050110742, (Jun. 30, 2008).

Huawei, et al., "CoMP clarification of definitions and TP", [online], 3GPP TSG RAN WG1 #54bis, Sep. 29, 2008, R1-083906.

LG Electronics: "Multi-layered Rate Control for Network MIMO in LTE-Advanced." 3GPP Draft TSG RAN WG1 Meeting #54bis; R1-083656, Prague, Czech Republic, (Sep. 29, 2008).

LG Electronics, "Network MIMO in LTE-Advanced", 3GPP TSG RAN WG1 Meeting #54, R1-082942, Aug. 18-22, 2008, pp. 1-5.

Vodafone Group, "Coordinated Multi Point transmission/reception Requirements", 3GPP TSG RAN WG1 Meeting #54bis, R1-083853, Sep. 29-Oct. 3, 2008.

Taiwan Search Report—TW098136009—TIPO—Dec. 1, 2013.

Bell A.S., et al., "Collaborative MIMO for LTE-Advanced Downlink," 3GPP Draft; R1-082812_DL Collaborative MIMO, 3rd Generation Partnership Project, (3GPP), Mobile Competence Centre; 650 Route Des Lucioles; F-06921 Sophia-Antipolis Cedex; France, No. Jeju; 20080812, Aug. 12, 2008, XP050316305, pp. 1-7.

European Search Report—EP14156786—Search Authority—The Hague—Apr. 28, 2014.

Mitsubishi Electric: "ICIC with Multi-Site Collaborative MIMO", 3GPP Draft; R1-083239, 3rd Generation Partnership Project (3GPP), Mobile Competence Centre; 650, Route Des Lucioles; F-06921 Sophia-Antipolis Cedex; France, No. Jeju, 20080812, Aug. 12, 2008, XP050316651.

Motorola: "LTE-A Multiple Point Coordination and Its Classification," 3GPP Draft; R1-083229 LTE-A Multi-Point Coordination Motorola, 3rd Generation Partnership Project (3GPP). Mobile Competence Centre; 650, Route Deslucioles; F-06921 Sophia-Antipolis Cedex; France, No. Jeju; 20080812, Aug. 12, 2008, XP050316643, pp. 1-6.

Samsung: "Inter-Cell Interference Mitigation Through Limited Coordination", 3GPP Draft; R1-082886 Inter-Cell Interference Mitigation Through Limited Coordination, 3rd Generation Partnership Project (3GPP), Mobile Competence Centre 650, Route Des Lucioles ; F-06921 Sophia-Anripolis Cedex ; France, No. Jeju; 20080812, Aug. 12, 2008, XP050316366, pp. 1-9.

* cited by examiner

METHOD AND APPARATUS FOR UPLINK NETWORK MIMO IN A WIRELESS COMMUNICATION SYSTEM

CROSS-REFERENCE

This application claims the benefit of U.S. Provisional Application Ser. No. 61/108,294, filed Oct. 24, 2008, and entitled "CONTROL SIGNALING FOR UPLINK NETWORK MIMO," the entirety of which is incorporated herein by reference.

BACKGROUND

I. Field

The present disclosure relates generally to wireless communications, and more specifically to techniques for supporting cooperative communication across network nodes in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices. In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

Further, in a multiple-in-multiple-out (MIMO) communication system, multiple sources and/or destinations (e.g., corresponding to respective antennas) can be utilized for the transmission and reception of data, control signaling, and/or other information between devices in the communication system. The use of multiple sources and/or destinations for respective transmissions in connection with a MIMO communication system has been shown to yield higher data rates, improved signal quality, and other such benefits over single-input and/or single-output communication systems in some cases. One example of a MIMO communication system is a Network MIMO (N-MIMO) or Coordinated Multipoint (CoMP) system, in which a plurality of network nodes can cooperate to exchange information with one or more receiving devices, such as user equipment units (UEs) or the like. In the case of uplink N-MIMO, wherein multiple network nodes cooperate to receive signals from respective users, it would be desirable to implement techniques for generating and utilizing control signaling in order to facilitate improved cooperation between the respective network nodes.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise receiving channel state information (CSI) reports from respective network nodes across which cooperative reception of respective transmissions from a user equipment unit (UE) is performed and computing a communication rate to be assigned to the UE for communication with the respective network nodes based at least in part on the CSI reports.

A second aspect described herein relates to a wireless communications apparatus, which can comprise a memory that stores data relating to a network user and one or more cooperative network nodes associated with uplink network multiple-in-multiple-out (N-MIMO) communication with the network user. The wireless communications apparatus can further comprise a processor configured to receive channel state information of the receiver (CSIR) reports from respective cooperative network nodes and to calculate a communication rate to be assigned to the network user based at least in part on the CSIR reports.

A third aspect relates to an apparatus, which can comprise means for obtaining uplink CSIR reports relating to a UE from respective network nodes within a coordinated reception framework associated with the UE and means for performing rate assignment for the UE based at least in part on the uplink CSIR reports.

A fourth aspect relates to a computer program product, which can comprise a computer-readable medium that comprises code for causing a computer to obtain uplink CSIR reports relating to a UE from respective network nodes within a coordinated reception framework associated with the UE and code for causing a computer to perform rate assignment for the UE based at least in part on the uplink CSIR reports.

A fifth aspect described herein relates to a method, which can comprise generating uplink CSI relating to a UE for which respective transmissions are received with inter-node cooperation and reporting generated uplink CSI to an uplink anchor node associated with the UE.

A sixth aspect described herein relates to a wireless communications apparatus, which can comprise a memory that stores data relating to a network user for which an uplink N-MIMO network framework is employed and a designated anchor node for the network user. The wireless communications apparatus can further comprise a processor configured to generate a CSIR report relating to the network user and to provide the CSIR report to the designated anchor node for the network user.

A seventh aspect relates to an apparatus, which can comprise means for identifying information relating to an uplink channel over which communication with a UE is conducted with inter-node cooperation and means for reporting identified information relating to the uplink channel to a designated anchor node for the UE.

An eighth aspect relates to a computer program product, which can comprise a computer-readable medium that comprises code for causing a computer to identify information relating to an uplink channel over which communication with a UE is conducted with inter-node cooperation and code for causing a computer to report identified information relating to the uplink channel to a designated anchor node for the UE.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
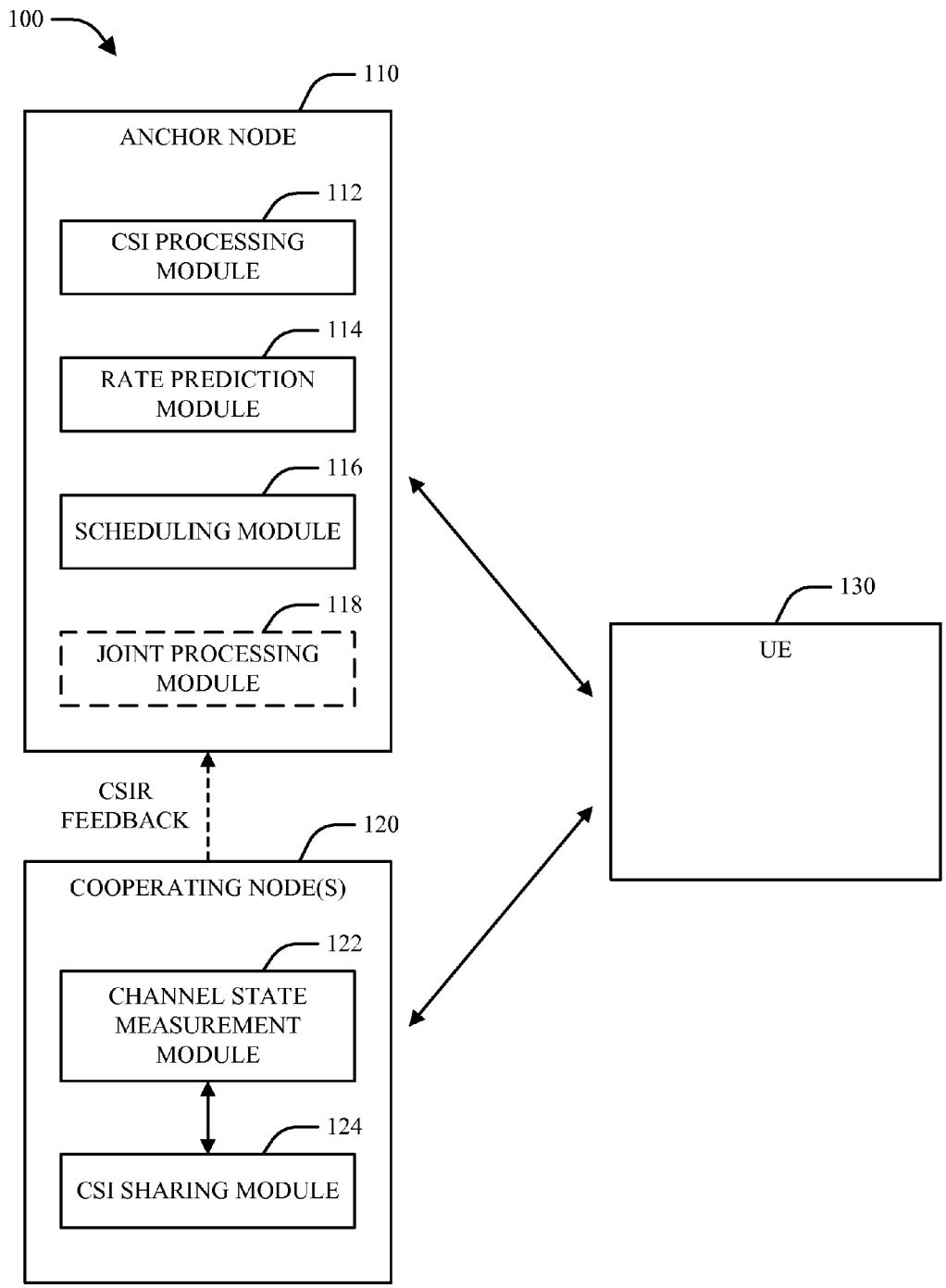
FIG. 1 is a block diagram of a system for coordinating cooperative transmissions between respective network nodes and user devices in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for coordinating cooperative transmissions between respective network nodes 110-120 and respective user devices, such as user equipment unit (UE) 130, in accordance with various aspects. In one example, respective UEs 130 in system 100 can communicate with one or more associated network nodes (e.g., access points, cells, Node Bs, Evolved Node Bs (eNodeBs or eNBs), etc.) cells, such as an anchor node 110 and one or more cooperating nodes 120. In one example, an anchor node 110 for a given UE 130 can serve as an attachment point with respect to control signaling communicated with the UE 130 and/or facilitate communication services to UE 130 in any other suitable manner with any degree of cooperation from respective cooperating nodes 120. However, while the terms "anchor node" and "cooperating node(s)" are used to refer to network nodes 110-120, it should be appreciated that no specific functionality of network nodes 110-120 is intended to be implied by such naming. For example, one or more cooperating nodes 120 can communicate control signaling with and/or facilitate communication service with a UE 130 in addition to, or in place of, an anchor node 110 in some cases. Further, it should be appreciated that respective network nodes 110-120 can correspond to and/or provide communication coverage for any suitable coverage area(s), such as an area associated with a macro cell, a femto cell (e.g., an access point base station or Home Node B (HNB)), and/or any other suitable coverage area.

In accordance with one aspect, UE 130 can communicate with any suitable number of network nodes 110 and/or 120. For example, UE 130 can conduct one or more uplink (UL, also referred to as reverse link (RL)) communications to network nodes 110 and/or 120, and respective network nodes 110 and/or 120 can conduct one or more downlink (DL, also referred to as forward link (FL)) communications to UE 130. In one example, system 100 can utilize one or more network multiple-in-multiple-out (Network MIMO or N-MIMO), coordinated multipoint (CoMP), and/or other techniques, by which a single UE 130 can communicate with a plurality of disparate network nodes 110-120. It can be appreciated that N-MIMO communication as performed within system 100 can leverage any suitable strategy or combination of strategies for cooperation between network nodes 110-120. Such strategies can include, for example, silencing, frequency reuse, coordinated beamforming (CBF), joint transmission (JT), and/or any other suitable cooperation strategies as described herein and/or as generally known in the art.

Figure 2:
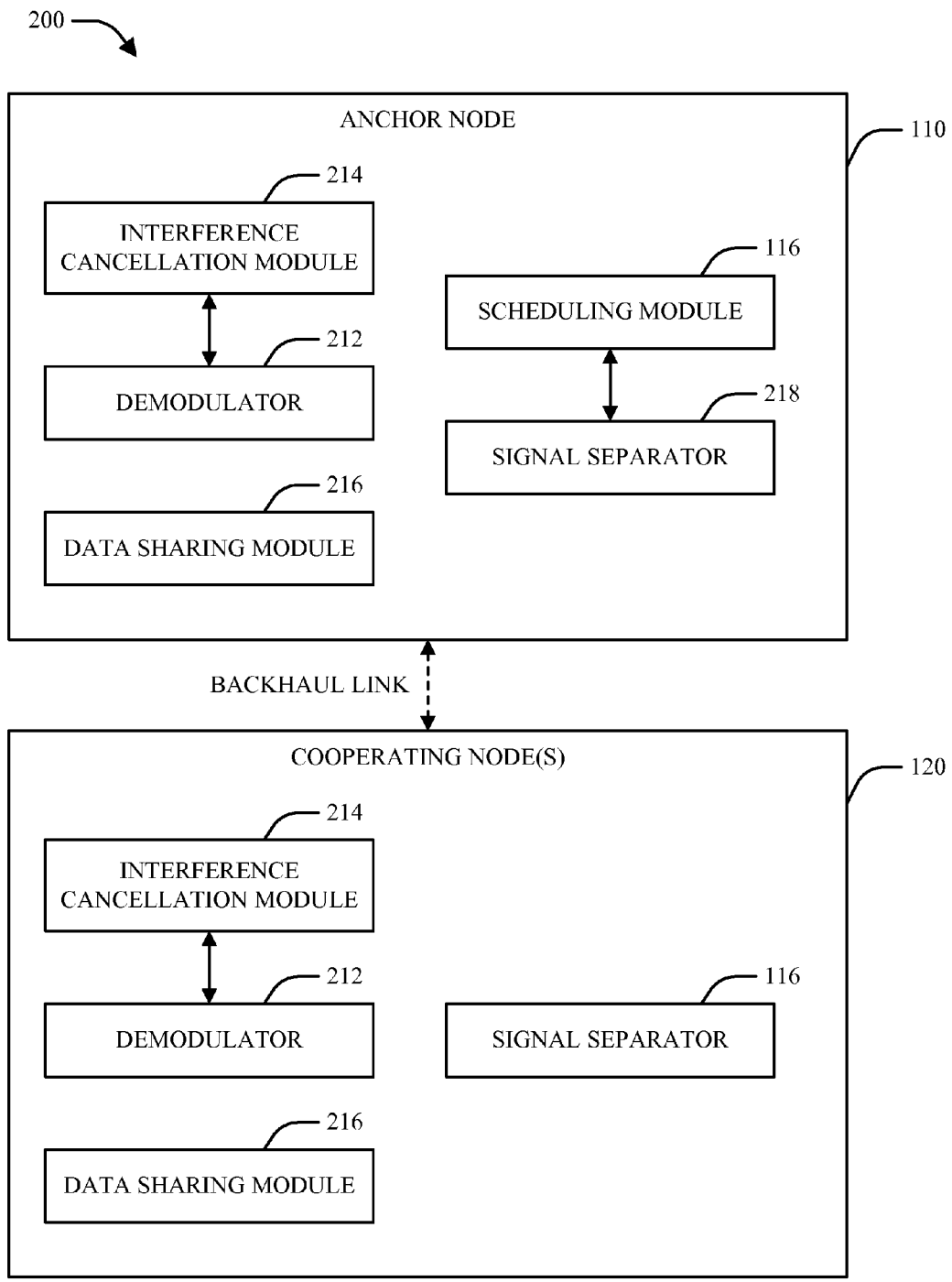
FIG. 2 is a block diagram of a system that facilitates cooperative processing of an uplink transmission across respective network nodes in accordance with various aspects.

In accordance with another aspect, system 100 can utilize one or more uplink N-MIMO techniques, in which multiple network nodes 110-120 can be leveraged for cooperative reception of uplink transmissions from one or more UEs 130. In one example, an anchor node 110 for a given UE 130 and respective cooperating nodes 120 can utilize one or more cooperation techniques for uplink N-MIMO as illustrated by system 200 in FIG. 2. In a first example illustrated by system 200, an anchor node 110 and one or more cooperating nodes 120 can utilize a soft handoff technique for uplink N-MIMO cooperation, wherein respective demodulators 212 and/or other mechanisms at multiple nodes 110-120 can attempt to demodulate respective UE transmissions.

In another example illustrated by system 200, cooperation between nodes 110-120 can be performed via demodulation of a UE data packet at a demodulator 212 and/or other means associated with a given network node 110 and/or 120, followed by cancellation of interference caused by the packet at a disparate node 110 and/or 120 (e.g., via an interference cancellation module 214 associated with a given network node 110 and/or 120). In a third example illustrated by system 200, cooperation between network nodes 110 and/or 120 can be conducted by sharing received information (e.g., in the form of received symbols, "soft bits" such as log-likelihood ratios, etc.) between cooperating network nodes 110-120 via respective data sharing modules 216 at the respective network nodes 110-120 and/or by other suitable means in order to enable joint modulation of the information at the respective network nodes 110-120.

In a further example illustrated by system 200, an anchor node 110 associated with one or more UEs can utilize a scheduling module 116 or other means to perform UE scheduling using space division multiple access (SDMA) and/or other scheduling schemes. Based on scheduling performed by scheduling module 116 at anchor node 110, respective UEs associated with anchor node 110 can be configured such that UEs utilizing the same resources in different cells can be separated (e.g., using minimum mean square error (MMSE)) by the receive antennas of the respective cells (e.g., by way of a signal separator 218 and/or other mechanisms associated with respectively corresponding network nodes 110-120).

As further illustrated in system 200, a backhaul link and/or other suitable means can be implemented between an anchor node 110 and one or more cooperating nodes 120 in order to facilitate coordination between the respective nodes 110-120. For example, anchor node 110 can utilize a backhaul link to one or more cooperating nodes 120 to share uplink assignment or grant information with the cooperating node(s) 120 (e.g., via a data sharing module 216 or other suitable means). Such assignment information can include, for example, the Cell Radio Network Temporary Identifier (C-RNTI) of a related UE, the resources (e.g., resource blocks or RBs) on which a given UE is scheduled, or the like. Additionally or alternatively, upon attempted demodulation of an uplink packet from a given UE, respective cooperating nodes 120 can utilize a backhaul link to an anchor node 110 for the UE to communicate (e.g., via data sharing module 216, etc.) indication(s) of successful or unsuccessful demodulation (e.g., in the form of an acknowledgment (ACK)/negative acknowledgement (NACK) signal) to anchor node 110 such that anchor node 110 can decide to terminate packet transmission or to continue re-transmissions based on the indication(s).

Returning to FIG. 1, an anchor node 110 for a given UE 130 can utilize a rate prediction module 114 to compute a projected supportable data rate for UE 130. Based on the predicted rate for UE 130, a scheduling module 116 and/or other suitable means at anchor node 110 can be utilized to schedule a rate to be utilized by UE 130 for transmissions to nodes 110 and/or 120.

Conventionally, it can be appreciated that uplink rate prediction and scheduling in a packet data system can be performed in various manners depending on uplink reception techniques utilized by the system. For example, in a non-orthogonal multiplexing system (e.g., a CDMA system) with soft handoff (e.g., 1× Evolution-Data Optimized (EV-DO)), uplink packets from a given UE can be demodulated by any node in the active set of the UE. In such an example, distributed scheduling is generally utilized, wherein a UE determines its uplink transmission rate autonomously via distributed interference management (e.g., based on reverse activity bit(s) sent by respective associated network nodes), policies set by the associated network, types of respective traffic flows associated with the UE, or the like. Further, rate prediction as performed in this manner can take into account channel conditions relative to all active set members for a given UE.

In another example, in non-orthogonal multiplexing systems that do not utilize soft handoff and/or orthogonal multiplexing systems (e.g. SC-FDMA and/or OFDMA systems such as LTE, UMB, WiMax, etc.), a single (or "serving") node for a UE can demodulate uplink transmissions of the UE and facilitate centralized scheduling for the UE. In such an example, scheduling and rate prediction for a UE can be based on uplink channel state as measured at the serving node for the UE directly.

In accordance with one aspect, system 100 can utilize a N-MIMO framework that employs orthogonal multiplexing (e.g., SC-FDMA multiplexing and/or OFDMA multiplexing) and centralized scheduling such that rate assignment for UE 130 is performed by the network and communicated to UE 130 by anchor node 110 as part of an uplink grant to UE 130. However, in the absence of channel state information from cooperating nodes 120, it can be appreciated that anchor node 110 (e.g., via rate prediction module 114) can in some cases be unable to accurately assess rates that can be supported with cooperative reception across nodes 110 and 120. Thus, in accordance with one aspect, respective cooperating nodes 120 involved in the demodulation of a packet from a given UE 130 can be configured to communicate uplink channel state information corresponding to UE 130 to anchor node 110 and/or another suitable centralized processing entity in system 100 that can perform rate prediction and/or scheduling.

In one example, respective cooperating nodes 120 can utilize a channel state measurement module 122, which can compute and/or otherwise obtain channel state information of the receiver (CSIR). CSIR obtained by channel state measurement module 122 can subsequently be reported as CSIR feedback to anchor node 110 by a CSI sharing module 124 and/or other suitable mechanisms at respective cooperating node(s) 120. Based on uplink CSIR reported from respective cooperating nodes 120, an anchor node 110 for a given UE 130 can utilize a CSI processing module 112 and/or other suitable means to support rate prediction and subsequent scheduling of the UE 130 and/or other appropriate operations.

Further, while system 100 illustrates CSI measurement at cooperating node(s) 120 and communication of corresponding CSIR feedback to anchor node 110, it should be appreciated that any other suitable information can be obtained by cooperating node(s) 120 and/or communicated to anchor node 110. For example, in addition to uplink CSIR sent from a given cooperating node 120 to anchor node 110, respective cooperating nodes 120 can submit information relating to observed interference levels and/or any other suitable operating parameter(s).

In accordance with another aspect, in addition to or in lieu of rate prediction and scheduling performed by anchor node 110 via respective modules 114-116, anchor node 110 and/or another suitable processing entity within system 100 can optionally leverage CSIR knowledge to perform joint processing of signals received by various cooperating nodes 120 (e.g., via a joint processing module 118) in order to achieve coherent combining of a related UE channel and/or nulling of interference across respective nodes.

Figure 3:
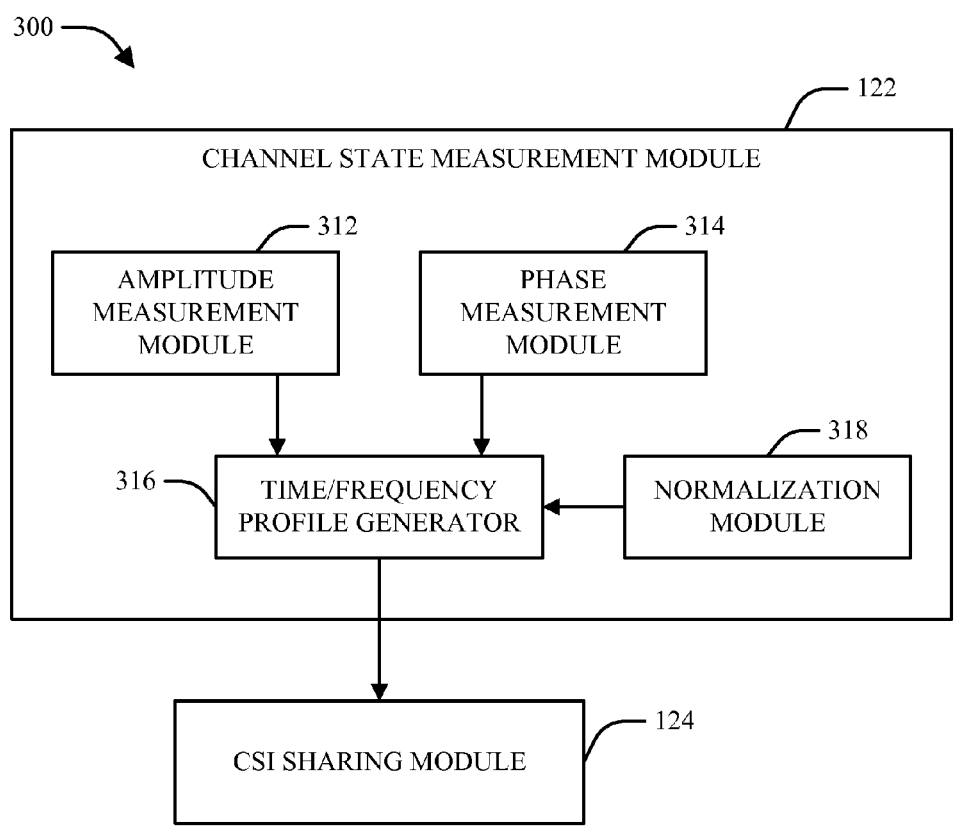
FIGS. 3-4 are block diagrams of respective systems for generating and reporting channel state information in accordance with various aspects.
Figure 4:
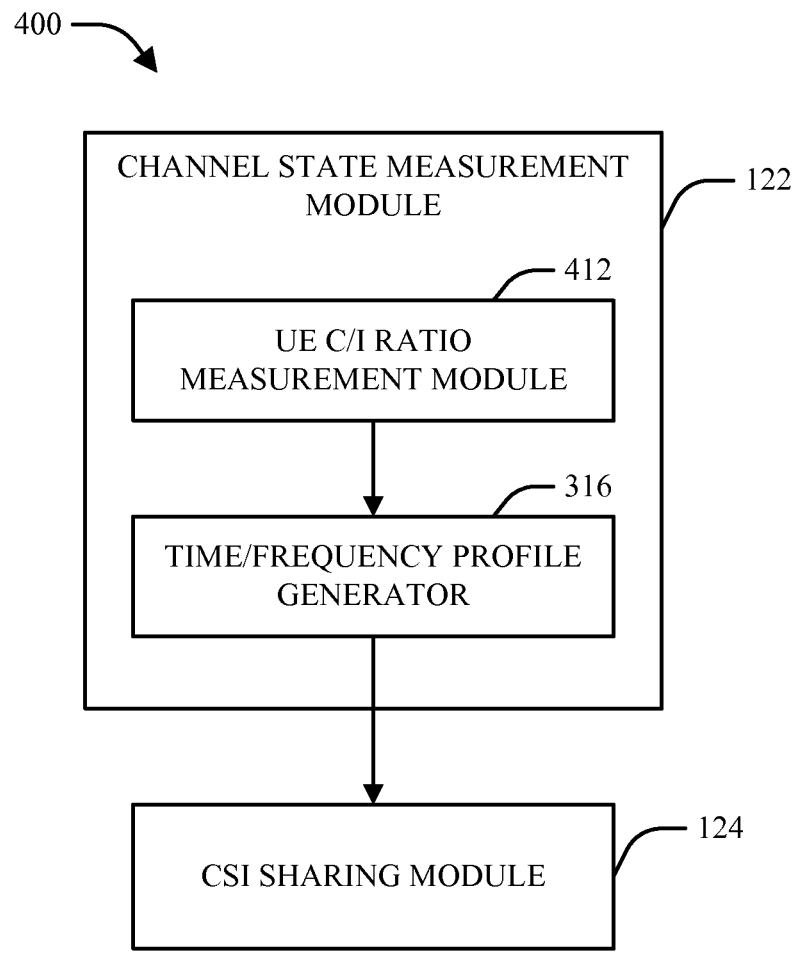
Figure 5:
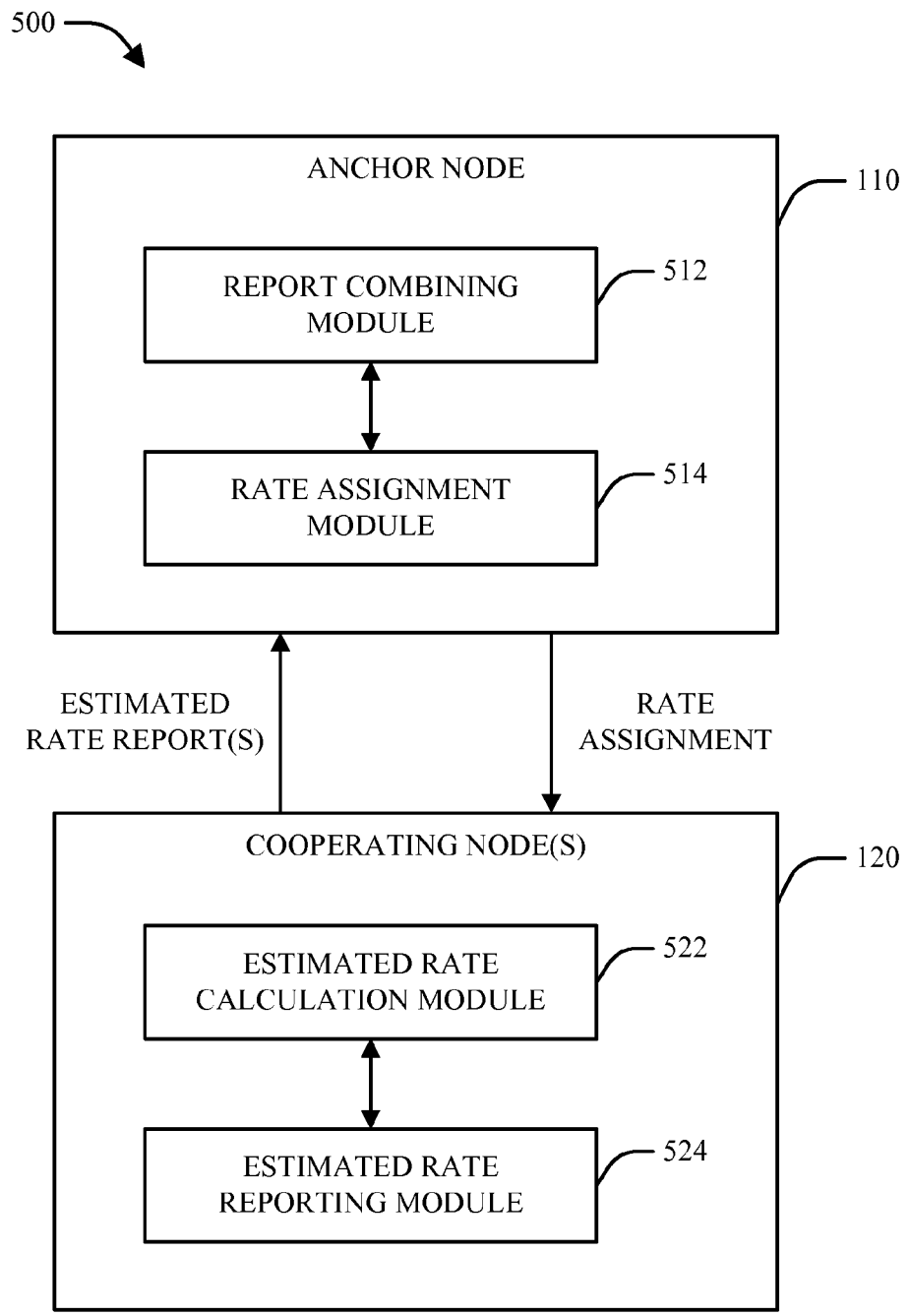
FIG. 5 is a block diagram of a system for generating and processing feedback relating to per-user supported rates associated with a wireless communication system in accordance with various aspects.

In accordance with a further aspect, uplink CSIR can be obtained and communicated by respective cooperating nodes 120 in various manners. Specific examples of CSIR communication techniques that can be employed are illustrated by FIGS. 3-5. It should be appreciated, however, that such examples are not intended to be exhaustive of all CSIR generation and/or communication techniques that could be employed. Further, it should be appreciated that the claimed subject matter is not intended to be limited to any specific implementation or combination thereof unless explicitly stated otherwise.

In a first example illustrated by diagram 300 in FIG. 3, a channel state measurement module 122 associated with a cooperating node (not shown) can utilize a time/frequency profile generator 316 and/or other suitable mechanisms to generate a profile corresponding to a given UE channel. A profile generated by time/frequency profile generator 316 can include, for example, amplitude and phase information as respectively obtained via an amplitude measurement module 312 and a phase measurement module 314. Additionally or alternatively, a normalization module 318 can be utilized to normalize a generated time/frequency profile by interference. Upon generation, a constructed time/frequency profile can subsequently be provided to a CSI sharing module 124 for communication to a corresponding anchor node (not shown). By generating and reporting a UE channel time/frequency profile in this manner, it can be appreciated that a receiving anchor node can conduct coherent combining of an associated UE channel as well as nulling of interference across nodes. In one example, interference normalization can be performed by normalization module 318 via scalar normalization or vector normalization (e.g., spatial interference whitening, interference nulling, etc.).

In a second example illustrated by diagram 400 in FIG. 4, a channel state measurement module 122 associated with a cooperating node (not shown) can utilize a time/frequency profile generator 316 and/or other suitable mechanisms to generate a profile corresponding to a given UE channel based on a measured carrier/interference (C/I) ratio for the corresponding UE (e.g., as measured by a UE C/I ratio measurement module 412). Upon generation, a constructed profile can be provided to a CSI sharing module 124 for communication to a corresponding anchor node (not shown) in a similar manner to that described above with respect to FIG. 3. By generating and reporting a UE C/I ratio time/frequency profile in this manner, it can be appreciated that a receiving anchor node can perform non-coherent combining across nodes. Further, it can be appreciated that reporting UE C/I ratio profiles can allow for accurate rate prediction at an associated anchor node even in the absence of data combining across nodes.

In a third example illustrated by diagram 500 in FIG. 5, respective cooperating nodes 120 can utilize an estimated rate calculation module 522 and/or other suitable mechanisms to determine an estimated rate supported on an uplink channel from a given UE to the respective cooperating nodes 120. Calculated estimated rates for respective UEs can be reported via an estimated rate reporting module 524 and/or other suitable means from respective cooperating nodes 120 to an associated anchor node 110, which can combine the respective reports (e.g., via a report combining module 512) to determine a rate assignment for the UE (e.g., via a rate assignment module 514).

In accordance with one aspect, report combining module 512 and/or rate assignment module 514 at anchor node 110 can combine estimated rate reports and determine corresponding rate assignments in any suitable manner. By way of specific example, report combining module 512 can combine respective rate reports by facilitating assignment of the highest reported rate. In one example, anchor node 110 may not in some cases have a highest uplink channel quality to a given UE among all cooperating nodes at all times. This can occur, for example, in systems where only a single node can be an anchor for a given UE on the uplink as well as the downlink and such anchor is chosen as a result of a tradeoff between uplink and downlink channel quality. However, it can be appreciated that even in such a scenario, the combining rule described above can offer substantial gains, such as, for example, in the presence of downlink/uplink link imbalance. Further, it can be appreciated that such a form of rate prediction can make the task of anchor selection substantially easier (e.g., in terms of downlink/uplink channel quality tradeoffs) and/or relax requirements on the speed of anchor reselection (e.g., during handoff).

Figure 6:
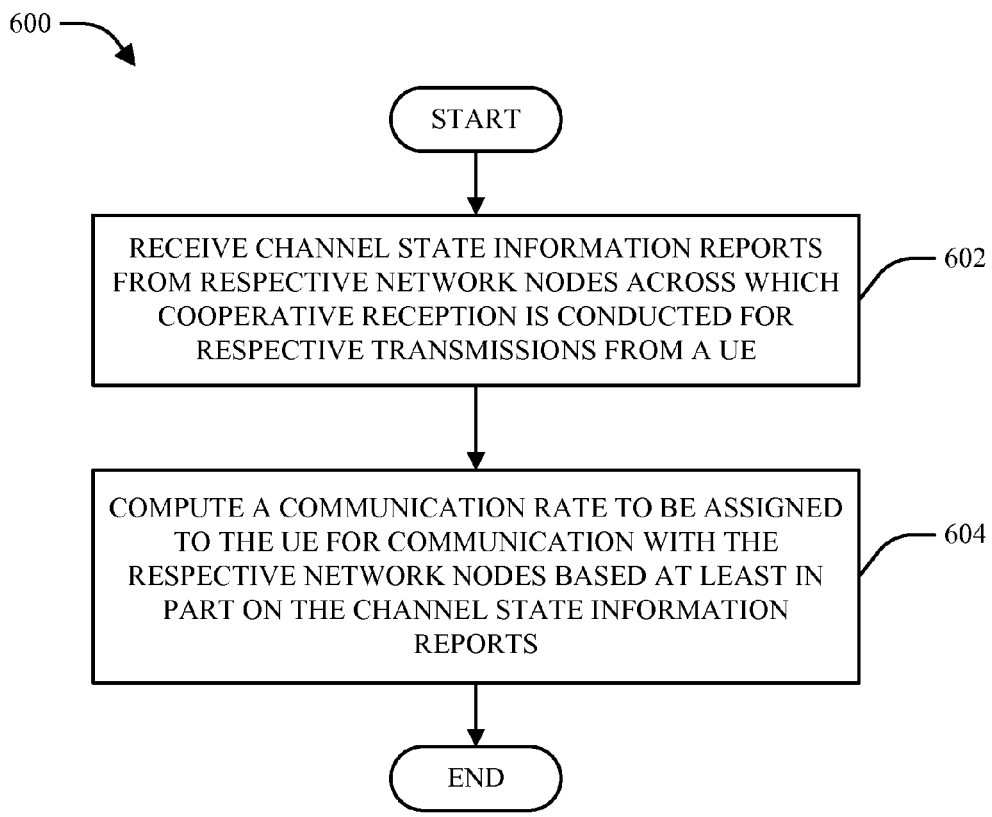
FIG. 6 is a flow diagram of a methodology for supporting cooperative uplink communication in a N-MIMO communication framework.
Figure 7:
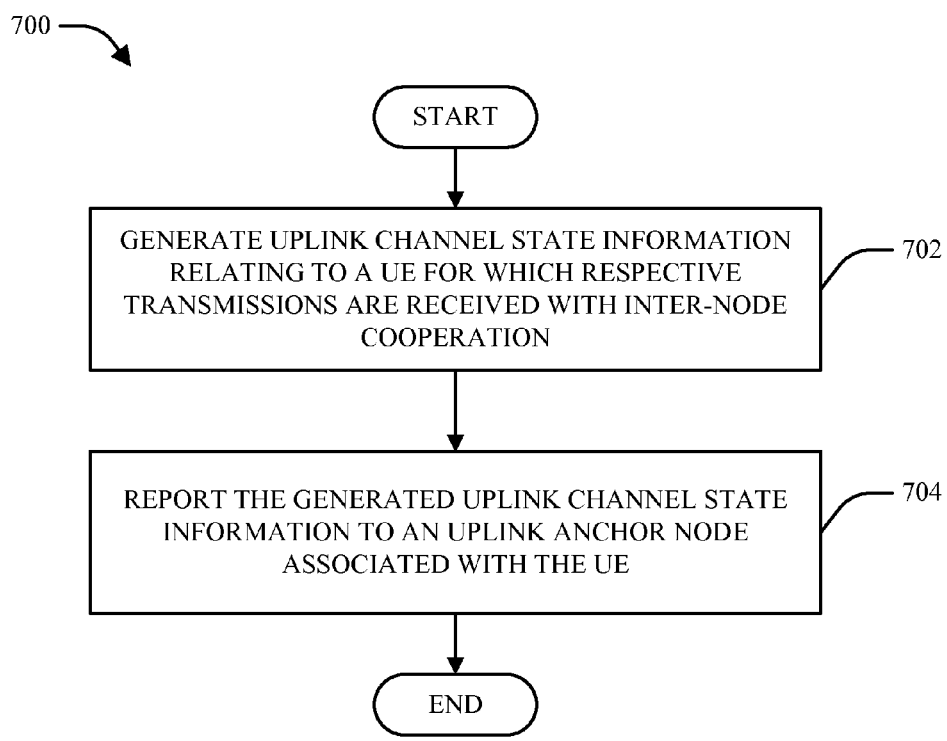
FIG. 7 is a flow diagram of a methodology for reporting channel state information to support uplink communication in a N-MIMO communication framework.

Referring now to FIGS. 6-7, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 6, illustrated is a methodology 600 for supporting cooperative uplink communication in a N-MIMO communication framework. It is to be appreciated that methodology 600 can be performed by, for example, a serving cell and/or other network node for a given network user (e.g., an anchor node 110 for a UE 130), a centralized processing entity within an associated packet data network, and/or any other appropriate network device. Methodology 600 can begin at block 602, wherein CSI reports are received from respective network nodes (e.g., cooperating nodes 120) across which cooperative reception is conducted for respective transmissions from a UE. Methodology 600 can conclude at block 604, wherein a communication rate to be assigned to the UE for communication with the respective network nodes from which CSI reports are received at block 602 is computed (e.g., via a CSI processing module 112 and/or a rate prediction module 114) based at least in part on the received CSI reports.

In one example, computation of a communication rate at block 604 can be performed by performing coherent and/or non-coherent combining of CSI reports received from respective network nodes, and/or by jointly or individually processing received CSI reports in any other suitable manner (e.g., via interference nulling across nodes, etc.). In another example, upon computing a rate associated with a UE at block 604, the computed rate and/or other suitable information can be communicated to the UE in an uplink assignment or grant and/or any other suitable signaling to the UE. In a further example, observed interference levels and/or other suitable information can be reported by respective network nodes in addition to CSI information at block 602, which can additionally be utilized at block 604 to perform scheduling and/or rate assignment with respect to an associated UE.

Turning next to FIG. 7, a flow diagram of a methodology 700 for reporting channel state information to support uplink communication in a N-MIMO communication framework is illustrated. Methodology 700 can be performed by, for example, a network node associated with an uplink CoMP framework for a given user device (e.g., a cooperating node 120 associated with a UE 130) and/or any other appropriate network entity. Methodology 700 begins at block 702, wherein uplink channel state information is generated (e.g., by a channel state measurement module 122) relating to a UE for which respective transmissions are received with internode cooperation. In accordance with one aspect, channel state information can be generated at block 702 in any suitable form. Forms that can be utilized can include, for example, a UE channel time/frequency profile (e.g., as generated by channel state measurement module 122 in system 300), a UE C/I ratio time/frequency profile (e.g., as generated by channel state measurement module 122 in system 400), an estimated supportable rate for a given UE (e.g., as generated by an estimated rate calculation module 522), or the like.

Upon completing the acts described at block 702, methodology 700 can conclude at block 704, wherein uplink channel state information generated at block 702 is reported to an uplink anchor node (e.g., anchor node 110) associated with the UE related to the channel state information. In one example, further information can be reported to an associated anchor node in addition to uplink channel state information at block 704. Such information can include, for example, interference information associated with a given UE, ACK/NACK signaling corresponding to the result of respective demodulation attempts for corresponding transmissions from the UE, or the like.

Figure 8:
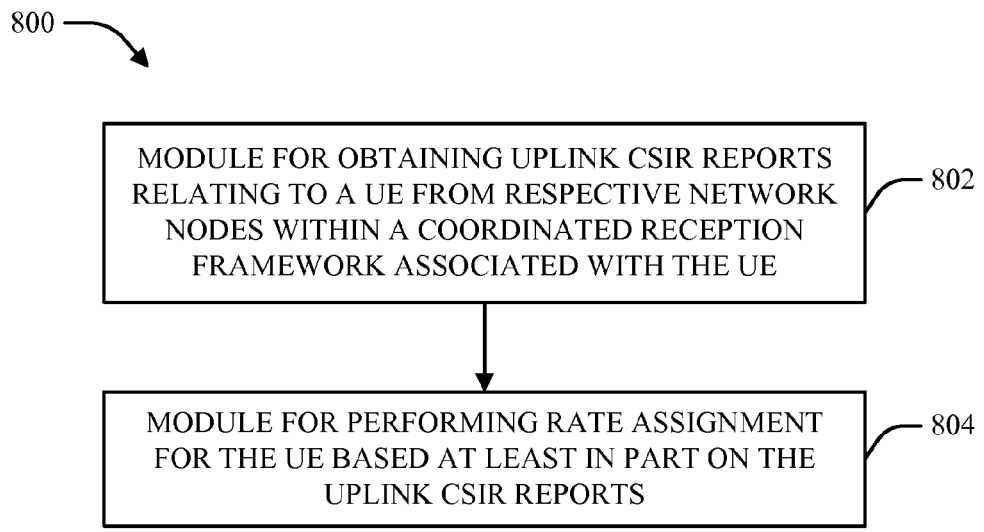
FIGS. 8-9 are block diagrams of respective apparatuses that facilitate control signaling generation and processing for uplink CoMP communication.
Figure 9:
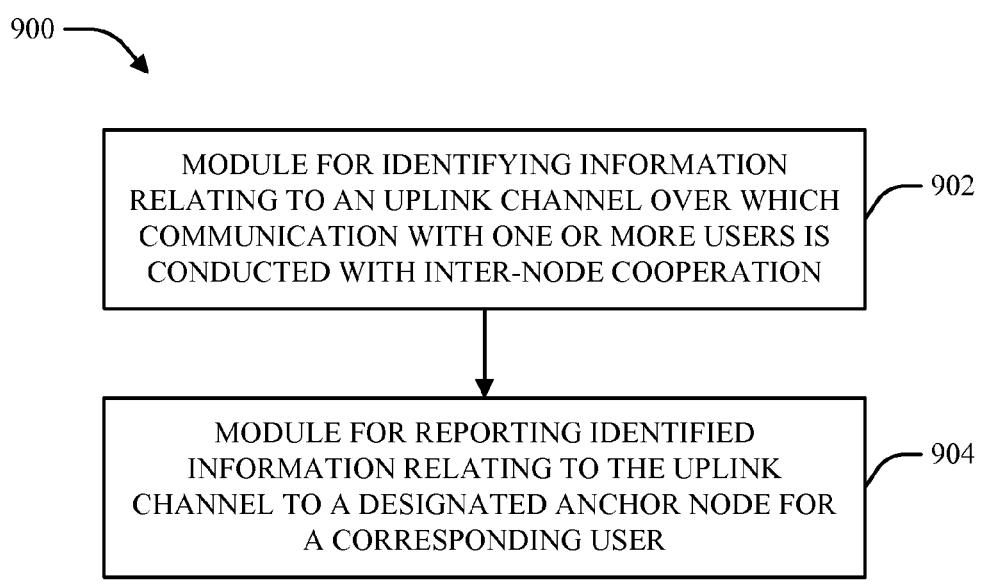

Referring now to FIGS. 8-9, respective apparatuses 800-900 that facilitate control signaling generation and processing for uplink CoMP communication are illustrated. It is to be appreciated that apparatuses 800-900 are represented as including functional blocks, which can be functional blocks that represent functions implemented by a processor, software, or combination thereof (e.g., firmware).

With specific reference to FIG. 8, a first apparatus 800 that facilitates control signaling generation and processing for uplink CoMP communication is illustrated. Apparatus 800 can be implemented by a designated anchor node for a network user (e.g., an anchor node 110 for a UE 130), a centralized processing entity for an associated packet data network (e.g., system 100), and/or another suitable network entity and can include a module 802 for obtaining uplink CSIR reports relating to a UE from respective network nodes within a coordinated reception framework associated with the UE and a module 804 for performing rate assignment for the UE based at least in part on the uplink CSIR reports.

FIG. 9 illustrates a second apparatus 900 that facilitates control signaling generation and processing for uplink CoMP communication. Apparatus 900 can be implemented by a network node (e.g., a cooperating node 120) utilized in cooperative reception of respective transmissions from a network user (e.g., UE 130) and/or another suitable network entity and can include a module 902 for identifying information relating to an uplink channel over which communication with one or more users is conducted with inter-node cooperation and a module 904 for reporting identified information relating to the uplink channel to a designated anchor node for a corresponding user.

Figure 10:
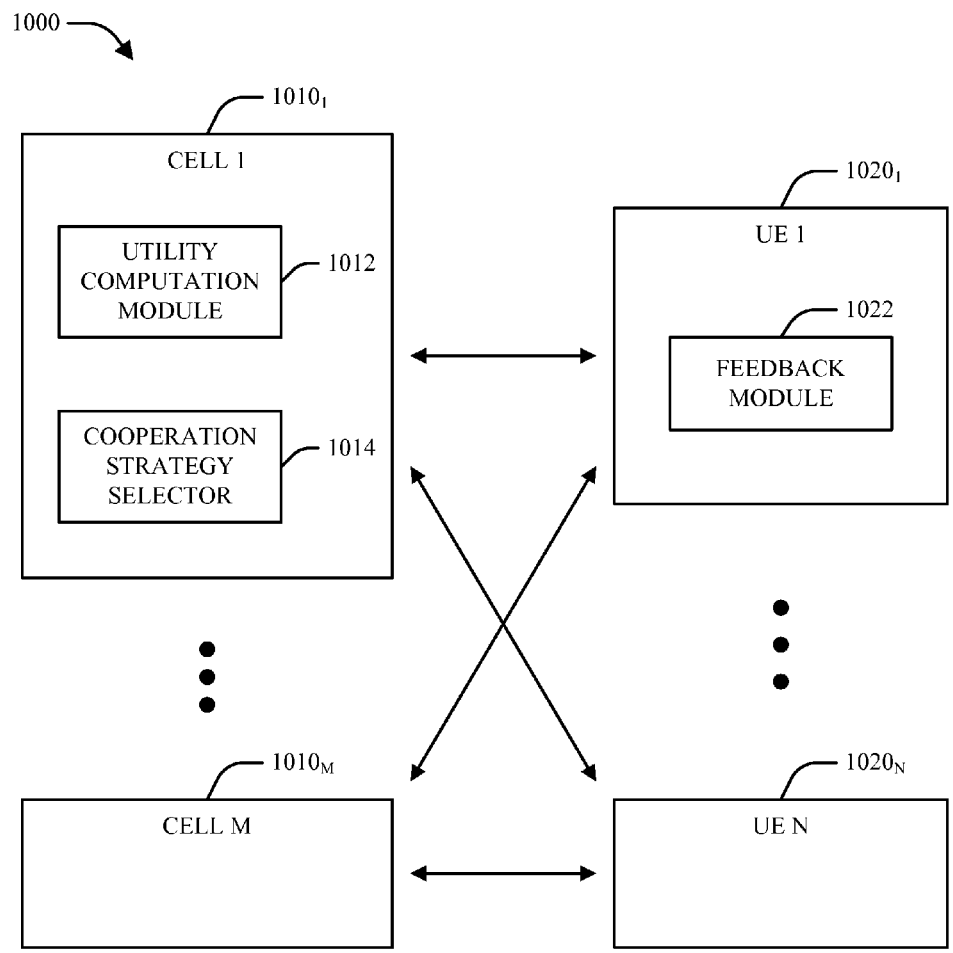
FIGS. 10-11 are block diagrams of respective example systems that facilitate coordinated multipoint communication in accordance with various aspects described herein.

Referring now to FIG. 10, an example system 1000 that facilitates coordinated multipoint communication in accordance with various aspects is illustrated. As illustrated in FIG. 10, system 1000 can include one or more network cells 1010 and/or other network nodes, which can communicate with respective UEs 1020 as generally described herein. In accordance with one aspect, respective cells 1010 in system 1000 can coordinate pursuant to one or more cooperation strategies in order to increase data rates associated with communication with a given UE 1020 and/or to reduce interference caused to other cells 1010 and/or UEs 1020 in system 1000. In one example, respective cells 1010 in system 1000 can be operable to utilize various cooperation techniques for uplink and/or downlink communication with one or more UEs 1020, such as coordinated silencing (CS), joint transmission (JT) via inter-eNodeB (inter-cell) packet sharing, coordinated beamforming (CBF), and/or any other suitable cell cooperation technique(s) as generally known in the art. In another example, various operational aspects of system 1000, such as respective cell cooperation techniques to be utilized for communication, cells 1010 to be utilized for such cooperation techniques, and respective UEs 1020 to be served via cooperative communication, can be controlled by a utility computation module 1012 and/or other suitable mechanisms of respective cells 1010. Further, determinations made by utility computation module 1012 can be supported at least in part by marginal utility calculations performed by one or more cells 1010 (e.g., via a utility computation module 1014) and/or any other suitable metric.

In general, a cooperation strategy selector 1014 can be utilized by a cell 1010 to compute and/or make scheduling decisions relating to node clustering, scheduling, forms of cooperative transmission to be utilized, and so on. A cooperation strategy can be selected by cooperation type selector 1014 based on factors such as UE mobility, C/I levels associated with respective UEs 1020, capabilities of backhaul links between respective cells, or the like. By way of example, cooperation type selector 1014 can select CS and/or another similar simple form of cell cooperation in the case of high-mobility UEs and/or rapidly changing channel conditions associated with a given UE 1020. Additionally or alternatively, if mobility of a given UE 1020 is determined to be low, or a high degree of antenna correlation is present with respect to the UE 1020, more advanced cooperation techniques such as JT via inter-cell packet sharing (e.g., in the case of a relatively slow backhaul link between cells 1010) or CBF (e.g., in the case of a relatively fast backhaul link between cells 1010) can be selected. In another example, utility computation module 1012 and/or cooperation strategy selector 1014 can operate based at least in part on information obtained from respective UEs 1020 (e.g., via a feedback module 1022 at the respective UEs 1020).

In accordance with one aspect, a projected rate associated with respective UEs 1020 can be calculated (e.g., by utility computation module 1012) and leveraged with factors such as backhaul bandwidth, latency constraints, or the like, to select between respective cooperation techniques. For example, cooperation type selector 1012 can rule out a JT technique using backhaul bandwidth and latency uncertainty based on associated a priori and/or long-term backhaul link classifications. In another example, channel state information at the transmitter (CSIT) delivery delay and accuracy, as well as scheduling delay and/or other suitable factors, can be factored in projected rate calculation.

By way of specific example, cooperation type selector 1014 can utilize a set of cooperation technique selection rules as follows. First, cooperation type selector 1014 can rule out a JT technique based on a long-term backhaul link classification. Further, cooperation type selector 1014 can consider CBF techniques over JT in the event that a ratio of a combined energy C/I to the best node C/I is below a predefined threshold. In addition, if an associated channel prediction error is above a threshold value, cooperation type selector 1014 can consider CS (e.g., in the event that CBF and/or JT are possible).

In accordance with another aspect, utility computation module 1012 can compute per-UE projected rates based on various factors. These factors can include, for example, propagation channels for respective links involved in a utilized cooperation strategy (e.g., taking into account power and bandwidth resources allocated per link); channel prediction accuracy based on projected downlink estimation error at respective UEs 1020 and corresponding feedback delay; anticipated interference levels from cooperative and non-cooperative network nodes (e.g., cells 1010 and/or UEs 1020), taking into account spatial interference structures as applicable; and/or any other suitable factors. In one example, respective UEs 1020 in system 1000 can provide information relating to downlink estimation errors, feedback delay, UE processing loss, interference nulling capability, and/or other information relating to the operational capabilities of the respective UEs 1020 to respective cells 1010 via feedback module 1022 and/or any other suitable means.

In one example, utility computation module 1012 can perform utility computations for a given UE 1020 based on various requirements for channel state information at the transmitter (CSIT). CSIT requirements can vary, for example, based on a cooperation strategy employed by respective cells 1010 with respect to a given UE 1020. By way of specific example, it can be appreciated that CSIT requirements associated with iterative signal processing and/or CBF can differ substantially between CSIT requirements for CS. In one example, a cell 1010 can utilize an assumption of accurate CSIT at moderate to high post-processing carrier to interference (C/I) levels in order to employ first order approximation of an associated CSIT effect. Additionally or alternatively, in the event that a substantially high error effect (e.g., due to spatial error) is encountered, CS can be favored by cell 1010 over more complex signal processing techniques. In accordance with one aspect, a threshold at which CS is selected over such techniques can be based on an empirical measure of channel prediction, as described in further detail herein.

In accordance with a further aspect, cooperation strategy selector 1014 can utilize one or more strategy utility maximization techniques for optimizing a cooperation strategy to be utilized with respect to respective UEs 1020. For example, one or more iterative utility maximization algorithms (e.g., algorithms similar to iterative pricing) can be utilized, wherein an iterative search is performed at respective network nodes (e.g., cells 1010, sectors within cells 1010, etc.) for respective candidate cooperation strategies. In one example, various cooperation technique constraints can be considered, which can be, for example, reflected in constraints on the beam coefficients of various nodes. In another example, first order extension can be utilized to update respective beam weights at respective iterations until convergence. In various implementations, convergence can be made dependent on an algorithm starting point, which can be selected in a variety of manners. For example, a starting point can be selected via zero-forcing (ZF) across respective cooperating nodes, maximum ratio combining (MRC) and/or MMSE-based approaches, or the like. In one example, power allocation techniques can be applied in addition to ZF and/or MRC.

Figure 11:
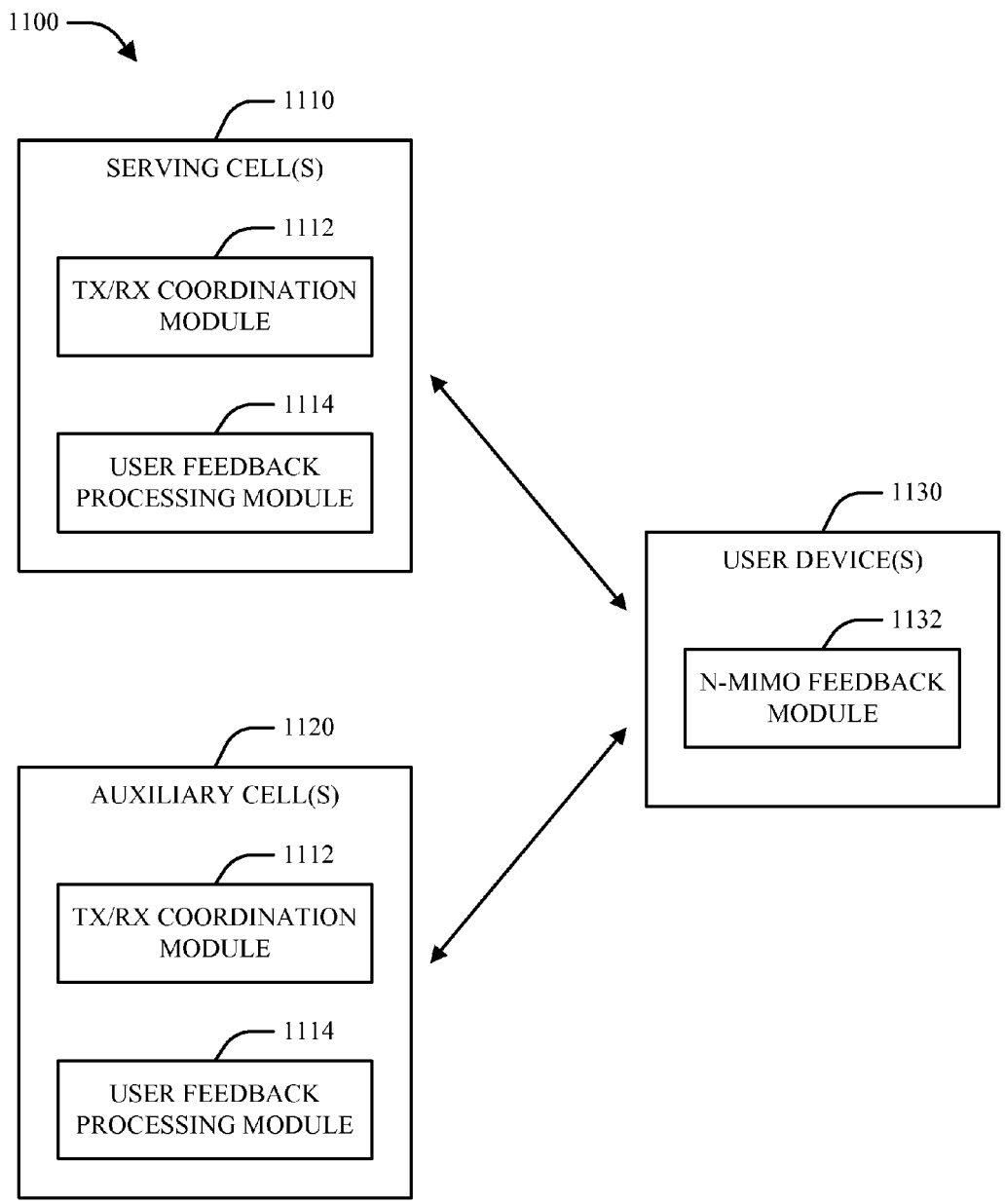

Referring next to FIG. 11, an example system 1100 that facilitates coordinated multipoint communication in accordance with various aspects described herein is illustrated. As FIG. 11 illustrates, system 1100 can include respective user devices 1130 that can communicate with one or more associated network cells, such as serving cell(s) 1110 and auxiliary cell(s) 1120. It should be appreciated, however, that no functionality of cells 1110-1120 is intended to be implied by the naming of "serving cell(s)" 1110 and "auxiliary cell(s)" 1120. For example, it should be appreciated that an auxiliary cell 1120 can serve a user device 1130 by providing communication coverage for user device 1130 in addition to, or in place of, a serving cell 1110 in some cases.

In accordance with one aspect, respective serving cells 1110 and auxiliary cells 1120 can cooperate to perform N-MIMO or CoMP communication with one or more user devices 1130. For example, various techniques can be utilized to facilitate cooperation between respective cells 1110-1120, between respective sectors associated with one or more cells 1110-1120, and/or any other suitable network entities. Such cooperation can be facilitated by, for example, a TX/RX coordination module 1112 associated with respective cells 1110-1120 and/or any other suitable mechanism(s). Further, TX/RX coordination module 1112 can facilitate cooperation between respective network entities according to any suitable network cooperation strategy(ies), such as fractional frequency reuse, silencing, coordinated beamforming, joint transmission, or the like.

In one example, coordinated beamforming can be conducted between network nodes associated with respective cells 1110-1120 by coordinating transmissions from the respective cells 1110-1120 such that if a transmission to a user device 1130 occurs from a given cell 1110 or 1120, a beam is chosen to serve the user device 1130 by the given cell 1110 or 1120 such that the transmission to the user device 1130 is orthogonal or otherwise substantially mismatched to user devices scheduled on neighboring cells 1110 and/or 1120. By doing so, it can be appreciated that beamforming gains can be realized for a desired user device 1130 while simultaneously reducing the effects of interference on neighboring network devices. In one example, coordinated beamforming can be facilitated by performing scheduling, beam selection, user selection (e.g., by selecting user devices 1130 having desirable beams that substantially limit interference at neighboring devices), or the like.

Additionally or alternatively, joint transmission can be conducted between a plurality of network nodes and a given user device 1130 by, for example, pooling resources designated for transmission to a given user device 1130 and transmitting the pooled resources via multiple distinct network nodes (e.g., nodes corresponding to a serving cell 1110 as well as an auxiliary cell 1120). For example, instead of a first cell transmitting a modulation symbol x to a first user and a second cell transmitting a modulation symbol y to a second user, the cells can cooperate such that the first cell transmits ax+by to one or both of the users and the second cell transmits cx+dy to the same user(s), where a, b, c, and d are coefficients chosen to optimize the signal-to-noise ratio (SNR) of the users, system capacity, and/or any other suitable metric(s). In one example, resource pooling among network nodes corresponding to different cells 1110-1120 can be conducted via a backhaul link between the cells 1110-1120 and/or any other suitable mechanism. In another example, similar techniques can be utilized for uplink joint transmission, wherein a user device 1130 can be configured to transmit data, control signaling, and/or other appropriate information to multiple network nodes.

In accordance with one aspect, various aspects of uplink and downlink CoMP communication can be based on feedback provided by respective user devices 1130. For example, a N-MIMO feedback module 1132 at respective user devices 1130 can be utilized to provide feedback to various cells 1110-1120, which in turn can utilize a user feedback processing module 1114 and/or other suitable means to utilize the feedback in conducting cooperative communication within system 1100. By way of example, in the case of downlink CoMP communication, a N-MIMO feedback module 1132 at user device(s) 1130 can facilitate channel reporting to respective cells 1110-1120 of respective serving cells as well as one or more neighboring non-cooperative cells. By way of another example, in the case of uplink CoMP communication, N-MIMO feedback module 1132 can provide feedback information to respective cells 1110-1120 in combination with respectively scheduled uplink transmissions to the cells 1110-1120 that can be utilized by the cells 1110-1120 to facilitate the removal of interference from the corresponding uplink transmissions.

Figure 12:
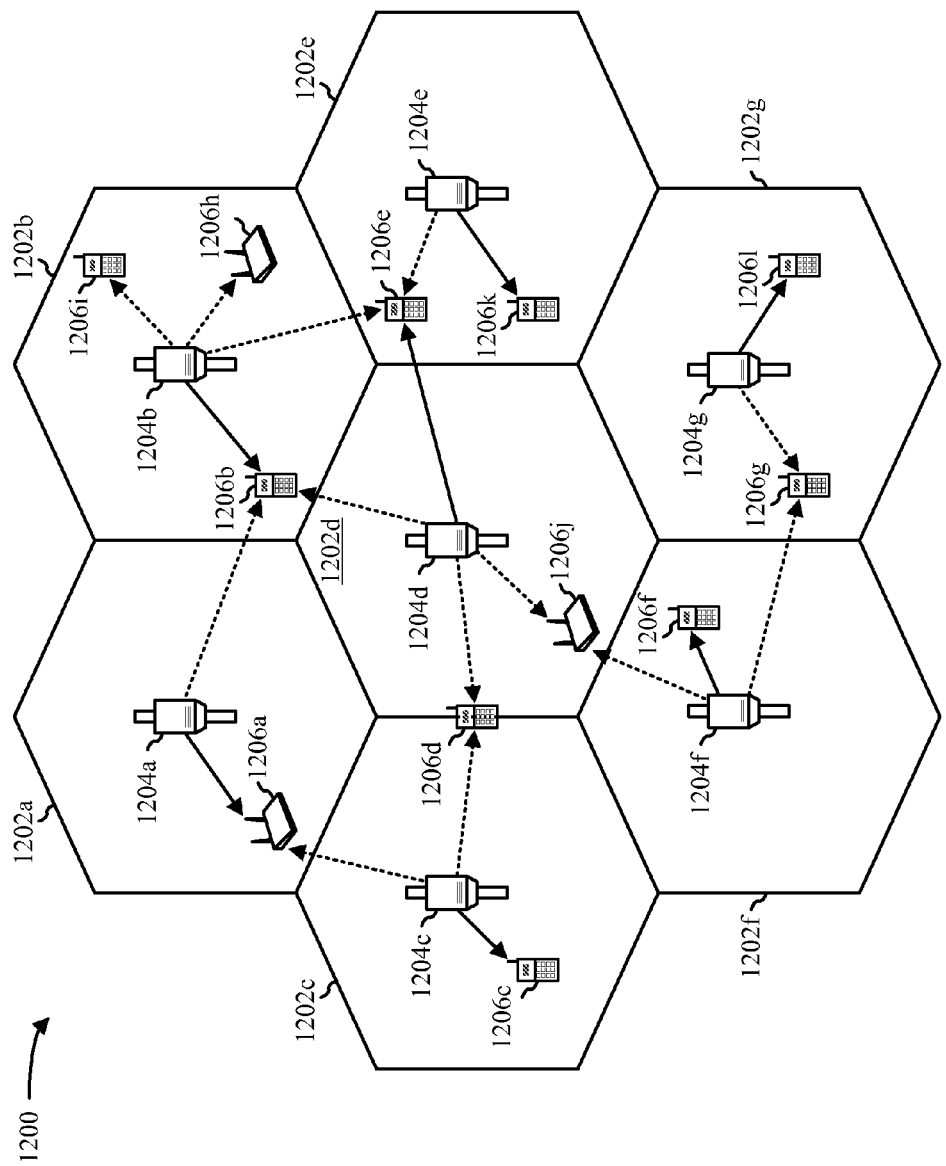
FIG. 12 illustrates an example wireless communication system in accordance with various aspects set forth herein.

Turning to FIG. 12, an exemplary wireless communication system 1200 is illustrated. In one example, system 1200 can be configured to support a number of users, in which various disclosed embodiments and aspects can be implemented. As shown in FIG. 12, by way of example, system 1200 can provide communication for multiple cells 1202, (e.g., macro cells 1202*a*-1202*g*), with respective cells being serviced by corresponding access points (AP) 1204 (e.g., APs 1204*a*-1204*g*). In one example, one or more cells can be further divided into respective sectors (not shown).

As FIG. 12 further illustrates, various access terminals (ATs) 1206, including ATs 1206*a*-1206*k*, can be dispersed throughout system 1200. In one example, an AT 1206 can communicate with one or more APs 1204 on a forward link (FL) and/or a reverse link (RL) at a given moment, depending upon whether the AT is active and whether it is in soft handoff and/or another similar state. As used herein and generally in the art, an AT 1206 can also be referred to as a user equipment (UE), a mobile terminal, and/or any other suitable nomenclature. In accordance with one aspect, system 1200 can provide service over a substantially large geographic region. For example, macro cells 1202*a*-1202*g* can provide coverage for a plurality of blocks in a neighborhood and/or another similarly suitable coverage area.

Figure 13:
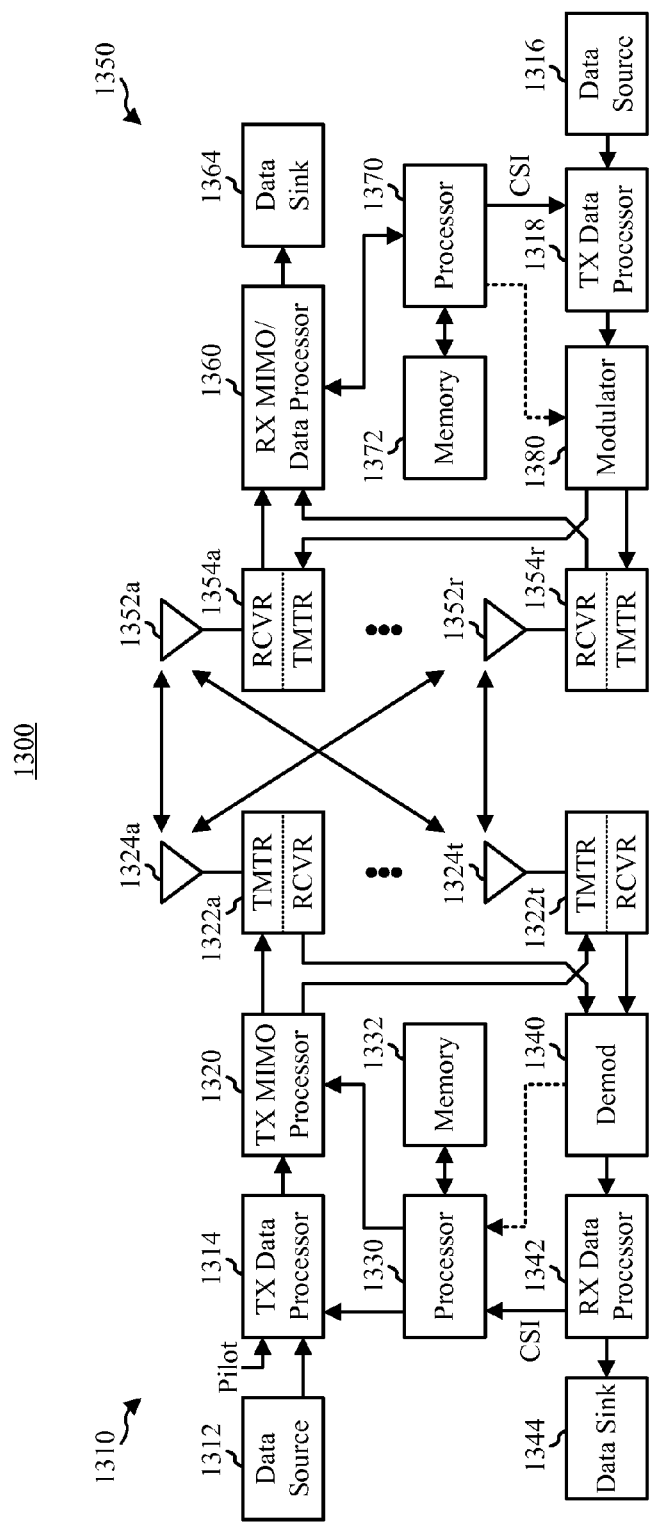
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX processor 1320, which can further process the modulation symbols (e.g., for OFDM). TX MIMO processor 1320 can then provides $N_T$ modulation symbol streams to $N_T$ transceivers 1322*a* through 1322*t*. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322*a* through 1322*t* can then be transmitted from $N_T$ antennas 1324*a* through 1324*t*, respectively.

In accordance with another aspect, the transmitted modulated signals can be received at receiver system 1350 by $N_R$ antennas 1352*a* through 1352*r*. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX processor 1360 can then process each symbol stream at least in part by demodulating, deinterleaving, and decoding each detected symbol stream to recover traffic data for a corresponding data stream. Thus, the processing by RX processor 1360 can be complementary to that performed by TX MIMO processor 1320 and TX data processor 1316 at transmitter system 1310. RX processor 1360 can additionally provide processed symbol streams to a data sink 1364.

In accordance with one aspect, the channel response estimate generated by RX processor 1360 can be used to perform space/time processing at the receiver, adjust power levels, change modulation rates or schemes, and/or other appropriate actions. Additionally, RX processor 1360 can further estimate channel characteristics such as, for example, signal-to-noise-and-interference ratios (SNRs) of the detected symbol streams. RX processor 1360 can then provide estimated channel characteristics to a processor 1370. In one example, RX processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354*a* through 1354*r*, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 14:
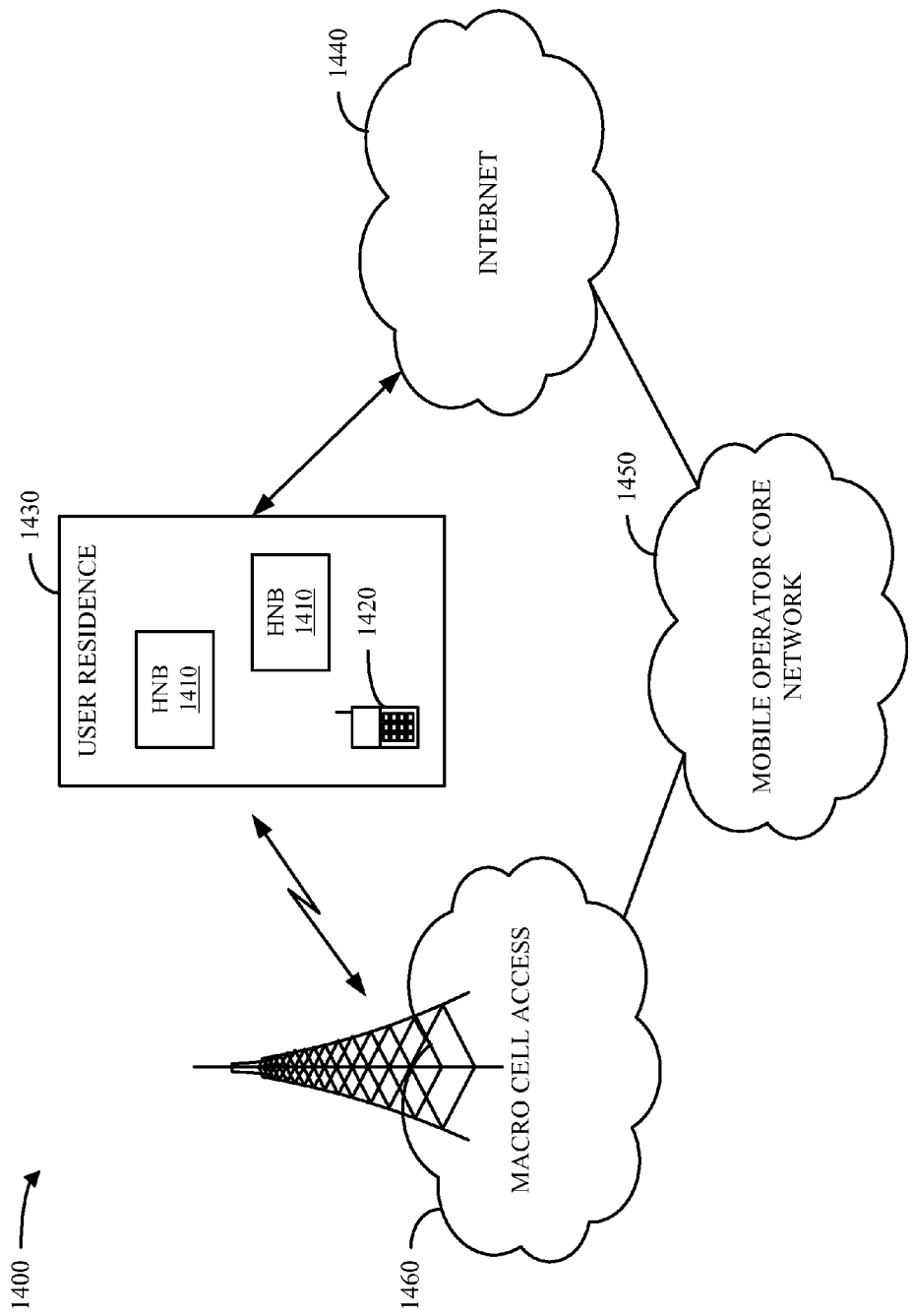
FIG. 14 illustrates an example communication system that enables deployment of access point base stations within a network environment.

FIG. 14 illustrates an example communication system 1400 that enables deployment of access point base stations within a network environment. As shown in FIG. 14, system 1400 can include multiple access point base stations (e.g., femto cells or Home Node B units (HNBs)) such as, for example, HNBs 1410. In one example, respective HNBs 1410 can be installed in a corresponding small scale network environment, such as, for example, one or more user residences 1430. Further, respective HNBs 1410 can be configured to serve associated and/or alien UE(s) 1420. In accordance with one aspect, respective HNBs 1410 can be coupled to the Internet 1440 and a mobile operator core network 1450 via a DSL router, a cable modem, and/or another suitable device (not shown). In accordance with one aspect, an owner of a femto cell or HNB 1410 can subscribe to mobile service, such as, for example, 3G/4G mobile service, offered through mobile operator core network 1450. Accordingly, UE 1420 can be enabled to operate both in a macro cellular environment 1460 and in a residential small scale network environment.

In one example, UE 1420 can be served by a set of Femto cells or HNBs 1410 (e.g., HNBs 1410 that reside within a corresponding user residence 1430) in addition to a macro cell mobile network 1460. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 1410 can be deployed on a single frequency or on multiple frequencies, which may overlap with respective macro cell frequencies.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   receiving, by an anchor node, channel state information (CSI) reports, which comprise UE channel time/frequency profiles, from one or more cooperating network nodes, wherein the anchor node and the one or more cooperating network nodes are configured to cooperatively receive uplink transmissions, from a user equipment unit (UE), using a network multiple-in multiple out (N-MIMO) technique, wherein the N-MIMO technique includes the one or more cooperating network nodes and the anchor node, connected via one or more backhaul links, receiving uplink signals in parallel from the UE; and
   computing, by the anchor node, a communication rate to be assigned to the UE for communication with the one or more cooperating network nodes based at least in part on the CSI reports.

2. The method of claim 1, wherein the UE channel time/frequency profiles comprising phase information and amplitude information.

3. The method of claim 2, wherein the UE channel time/frequency profiles are normalized by interference.

4. The method of claim 1, wherein the receiving comprises receiving UE carrier to interference (C/I) ratio time/frequency profiles from the one or more cooperating network nodes.

5. The method of claim 1, wherein:
   the receiving comprises receiving estimated rates supported on an associated uplink channel from the UE to the one or more cooperating network nodes; and
   the computing comprises computing a communication rate to be assigned to the UE at least in part by combining the estimated rates received from the one or more cooperating network nodes.

6. The method of claim 5, wherein the computing further comprises combining the estimated rates received from the one or more cooperating network nodes at least in part by selecting a highest estimated rate from among the estimated rates received from the one or more cooperating network nodes.

7. The method of claim 1, further comprising receiving interference information from the one or more cooperating network nodes across which cooperative reception of transmissions from the UE is performed, wherein the computing comprises computing a communication rate to be assigned to the UE for communication with the one or more cooperating network nodes based at least in part on the interference information.

8. The method of claim 1, further comprising:
   receiving acknowledgement (ACK) or negative acknowledgement (NACK) signaling from the one or more cooperating network nodes each indicative of successful or unsuccessful modulation of a transmissions from the UE; and
   generating a transmission schedule for the UE based at least in part on the ACK or NACK signaling.

9. The method of claim 1, further comprising conveying a computed communication rate to an associated UE in an uplink grant signaling message to the UE.

10. A wireless communications apparatus, comprising:
    a memory, of an anchor node, that stores data relating to a network user and one or more cooperative network nodes associated with uplink network multiple-in-multiple-out (N-MIMO) communication with the network user, wherein the N-MIMO communication includes the one or more cooperative network nodes and the anchor node connected via one or more backhaul links receiving uplink signals in parallel from a user equipment unit (UE); and a processor of the anchor node configured to receive channel state information of a receiver (CSIR) reports, which comprise time/frequency profiles corresponding to an uplink channel between the network user and the one or more cooperative network nodes, from the one or more cooperative network nodes and to calculate a communication rate to be assigned to the network user based at least in part on the CSIR reports.

11. The wireless communications apparatus of claim 10, wherein the time/frequency profiles comprising phase information and amplitude information.

12. The wireless communications apparatus of claim 10, wherein the CSIR reports comprise carrier to interference (C/I) ratio time/frequency profiles relating to carrier and interference levels observed by the one or more cooperative network nodes.

13. The wireless communications apparatus of claim 10, wherein the CSIR reports comprise estimated rates supported by the one or more cooperative network nodes on an uplink channel from the network user to the one or more cooperative network nodes and the processor is further configured to calculate a communication rate to be assigned to the network user at least in part by combining the estimated rates received from the one or more cooperative network nodes.

14. The wireless communications apparatus of claim 13, wherein the processor is further configured to combine the estimated rates received from the one or more cooperative network nodes by selecting a highest estimated rate from among the estimated rates.

15. The wireless communications apparatus of claim 10, wherein the processor is further configured to receive interference reports from the one or more cooperative network nodes and to calculate a communication rate to be assigned to the network user based at least in part on the interference reports.

16. The wireless communications apparatus of claim 10, wherein the processor is further configured to transmit a communication rate calculated for a network user within uplink grant signaling to the network user.

17. An apparatus, comprising:
means for obtaining, by an anchor node, uplink channel state information of the receiver (CSIR) reports, which comprise UE channel time/frequency profiles relating to a user equipment unit (UE), from one or more cooperating network nodes within a coordinated reception framework associated with the UE, using a network multiple-in multiple out (N-MIMO) technique, wherein the N-MIMO technique includes the one or more cooperating network nodes and the anchor node connected via one or more backhaul links receiving uplink signals in parallel from the UE; and means for performing rate assignment, by the anchor node, for the UE based at least in part on the uplink CSIR reports.

18. The apparatus of claim 17, wherein the UE channel time/frequency profiles comprising phase information and amplitude information.

19. The apparatus of claim 17, wherein the means for obtaining comprises means for obtaining UE carrier to interference (C/I) ratio time/frequency profiles from the one or more cooperating network nodes.

20. The apparatus of claim 17, wherein:
the means for obtaining comprises means for obtaining information relating to estimated rates supported on an associated uplink channel from the UE to the one or more cooperating network nodes; and
the means for performing rate assignment comprises means for performing rate assignment for the UE at least in part by combining information relating to estimated rates obtained from the one or more cooperating network nodes.

21. The apparatus of claim 20, wherein the means for performing rate assignment further comprises means for combining information relating to estimated rates obtained from the one or more cooperating network nodes at least in part by selecting a highest estimated rate indicated in the information relating to estimated rates obtained from the one or more cooperating network nodes.

22. A computer program product, comprising:
a non-transitory computer-readable medium, comprising:
code for causing a computer to obtain, by an anchor node, uplink channel state information of a receiver (CSIR) reports, which comprise UE channel time/frequency profiles relating to a user equipment unit (UE), from one or more cooperating network nodes within a coordinated reception framework associated with the UE using a network multiple-in multiple out (N-MIMO) technique, wherein the N-MIMO technique includes the one or more cooperating network nodes and the anchor node connected via one or more backhaul links receiving uplink signals in parallel from the UE; and
code for causing the computer to perform rate assignment, by the anchor node, for the UE based at least in part on the uplink CSIR reports.

23. The computer program product of claim 22, wherein the UE channel time/frequency profiles comprising phase information and amplitude information.

24. The computer program product of claim 22, wherein the code for causing the computer to obtain comprises code for causing the computer to obtain UE carrier to interference (C/I) ratio time/frequency profiles from the one or more cooperating network nodes.

25. The computer program product of claim 22, wherein:
the code for causing the computer to obtain comprises code for causing the computer to obtain information relating to estimated rates supported on an associated uplink channel from the UE to the one or more cooperating network nodes; and
the code for causing the computer to perform rate assignment comprises code for causing the computer to perform rate assignment for the UE at least in part by combining information relating to estimated rates obtained from the one or more cooperating network nodes.

* * * * *